April 6, 1937.　　　　A. B. KINZEL　　　　2,076,515

METHOD OF HEAT TREATING PLANE AND UNIDIMENSIONAL CURVED METALLIC SURFACES

Filed Sept. 16, 1933

INVENTOR
AUGUSTUS B. KINZEL
BY
ATTORNEY

Patented Apr. 6, 1937

2,076,515

UNITED STATES PATENT OFFICE 2,076,515

METHOD OF HEAT TREATING PLANE AND UNIDIMENSIONAL CURVED METALLIC SURFACES

Augustus B. Kinzel, Flushing, N. Y., assignor, by mesne assignments, to Union Carbide and Carbon Corporation, a corporation of New York Application September 16, 1933, Serial No. 689,722

2 Claims. (Cl. 148—21.5)

This invention relates to a method of heat treating metallic objects and has more particular application to a method of hardening the surface of metallic objects by reciprocally moving a heating means relative to the object.

Heretofore it has been the practice to harden various metallic bodies, such as those made of steel and other ferrous alloys, by raising the surface temperature to the critical range and quenching in a bath or in a jet of cooling medium. Heat has been applied either by placing the body in a furnace or by directing a high temperature flame along the surface. It has also been found advantageous in heat treating curved or rounded objects, such as bearings, shafting and trunnions, to rotate them rapidly under a source of heat so as to bring the temperature uniformly to the critical range. However, in applying heat by means of an oxy-acetylene blowpipe or an electric arc to the surface of bodies to be hardened, it is often impossible to employ a rotative method on account of the shape or width of the body.

An object of this invention therefore is to provide an improved method of uniformly raising the temperature of relatively large metallic bodies. Another object of this invention is to provide a means for reciprocally moving a heat producing apparatus relative to the surface of a metallic body which is to be case hardened. Still another object of this invention is to provide means for reciprocally and rotatively moving a high temperature producing apparatus relative to a metallic body which is subjected to heat treatment. These objects and others together with the novel features of this invention will be more evident from the following description having reference to the accompanying drawing, in which—

Figure 1:
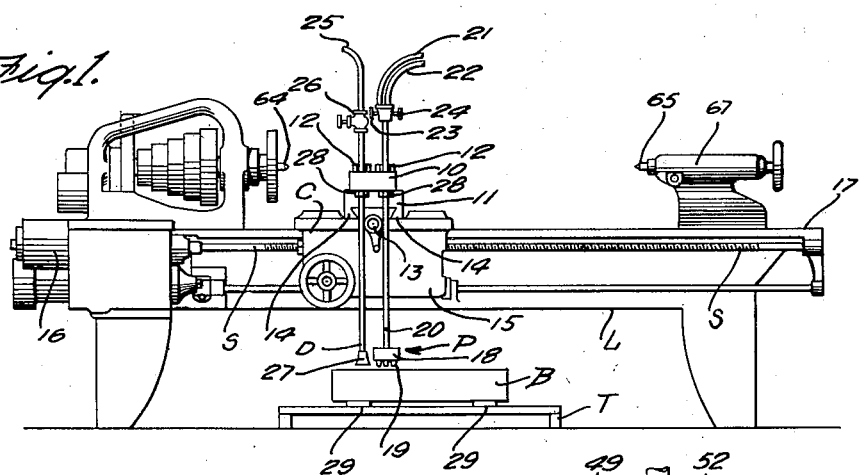
Fig. 1 is a view in elevation of a device illustrating one embodiment of my invention and comprising a blowpipe mounted on a lathe for reciprocating movement relative to the work.

In accordance with this invention the surface of a metallic body B may be heat treated by setting up the body B on a support T and reciprocally moving a blowpipe P with respect to the surface to be hardened. The blowpipe P, as shown in Fig. 1, may be mounted on the carriage C of a lathe L which is capable of moving the blowpipe back and forth over the work. A screw-cutting machine lathe has been found best suitable for this purpose, but any type of lathe may be used which has a reversible, power-driven lead screw.

The blowpipe P and a cooling jet producing means D may be supported by a block 10 attached to the slide rest 11 of the lathe and extend out away from the side of the lathe so as to overhang the work or body B. A number of bolts 12 serve to clamp the block 10 tightly against the slide rest 11 and insure cooperating lateral movement of the block 10 together with the slide rest 11 across the carriage C. A crank 13 operates the slide rest 11 by means of a screw which is operable in the usual manner between dovetail supports 14 of the rest 11.

The lathe L is provided with a lead screw S which cooperates with a threaded bore in an apron 15 that forms an integral part of the carriage C. Power driven means 16 which may comprise the conventional gears and a reversing mechanism (not shown) operate the lead screw S so as to move the carriage C back and forth on the shears or bed of the lathe 17 and for a distance substantially equal to the length of the work B. By terminating the reciprocatory movement of the blowpipe before it reaches the ends of the work B the tendency to overheat the end edges of the work during the intervals of reversal of the blowpipe is eliminated, and the end areas are raised to the critical range of temperatures by conductance of heat from the adjacent areas.

The blowpipe P preferably comprises a head 18 having a plurality of nozzles 19 which are adapted to produce heating jets which tend to overlap and which extend across substantially the entire width or one dimension of the surface of the work to be heat treated. In this manner a high temperature heating flame of sheet-like form is produced. A sufficiently large head is employed to accommodate work of various widths, the outer nozzles which extend beyond the edges of the work being blanked off when they are not required. A stem 20 may serve to connect the head 18 with an oxygen conduit 21 and an acetylene conduit 22 which are flexible and are connected with suitable sources of gas supply. Valves 23 and 24 may be provided to control the passage of gas through the conduits 21 and 22 respectively.

The conduit or cooling jet means D may be arranged substantially parallel to the stem 20 and be supplied with water in any suitable manner, preferably through a flexible hose 25, and the flow of water controlled by a valve 26. In order to distribute the jet of water or other cooling liquid over the entire width of the heated surface, a fishtail nozzle 27 may be employed at the lower end of the conduit D to provide a sheet of cooling liquid extending across one dimension of the surface heated. Both the blowpipe P and the conduit D may be passed through apertures in the block 10 and be secured thereto by lock nuts 28, or by other suitable means.

To heat treat a surface of the body B the body is blocked up on the support T by shims 29 until the upper surface of the body is brought within a short distance of the nozzles 19 so that the full intensity of the blowpipe flames will impinge on the surface. The carriage C is adjusted to move back and forth substantially over the entire length of the body B, and after the blowpipe jets are ignited, the lead screw S is set in operation. As the blowpipe P moves to and fro over the body B the surface is raised to the critical range of temperature, and when the critical range is reached, the gas supply may be shut off and the cooling medium applied to the body B by opening the valve 26. After sufficient time has elapsed for adequate cooling of the surface, the body B may be removed or re-positioned for hardening one or more of the remaining surfaces.

The critical range of temperature at which it is desired to discontinue heating and to apply the quench is determined either by the cherry red color of the surface of the work or by the length of time elapsed during which heat has been applied. The actual temperature at which quenching should take place will vary according to the quality and constituents of the metal being hardened.

Figure 2:
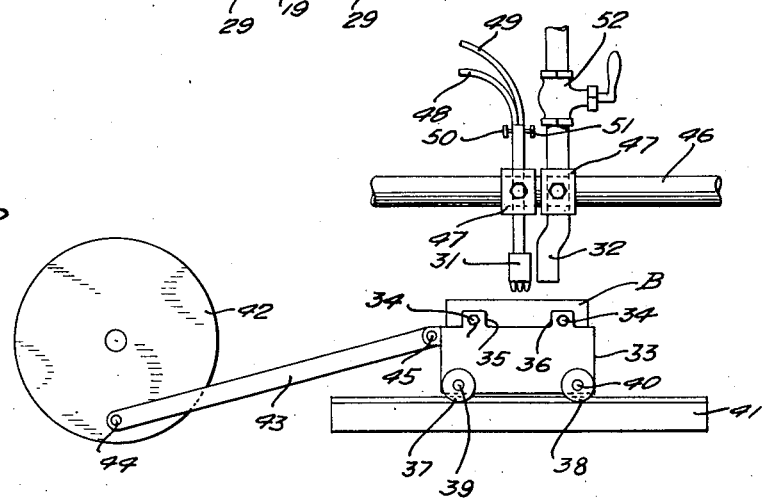
Fig. 2 is a side view of an alternative embodiment of this invention in which the work is mounted on a carriage capable of being moved to and fro under a blowpipe.

An alternative embodiment of this invention, as shown in Fig. 2, may comprise an apparatus for moving the body B to be heat treated in a reciprocating manner relative to a blowpipe 31 and jet producing nozzle 32. The body B may be supported by a carriage 33 on which it is firmly held by bolts 34 engaged in lugs 35, 36 on each side of the carriage. The carriage 33 may be provided with pairs of flanged wheels 37, 38 mounted on axles 39, 40 supported in bearings which are connected with the carriage, the pairs of wheels 37, 38 being operable on spaced track members 41.

The carriage 33 may be moved on the track by a power driven eccentric 42 and a connecting rod or link 43. At each end of the rod 43 pins 44 and 45 respectively serve to join the rod with the eccentric and with the carriage and to permit a swivel action when the eccentric is set in motion. The carriage operates back and forth on the rails 41 in straight line motion in accordance with the driving action of the rod. A speed of 60 reversals per minute has been found to be suitable for efficient operation although other speeds may be employed in accordance with the size or thickness of the body to be heat treated.

Both the blowpipe 31 and the nozzle 32 may be mounted on a stationary member 46 by clamps 47, through which the elevation of the blowpipe and nozzle may be changed to accommodate for work of different size. Oxygen and acetylene gases are supplied to the blowpipe 31 by conduits 48 and 49, the flow therethrough being controlled by valves 50 and 51 respectively, and water or other cooling medium is supplied to the nozzle 32 through a quick acting valve 52. It will be appreciated that metallic bodies may be heat treated by moving the body relative to a stationary blowpipe and cooling jet nozzle in much the same manner as in the method previously described for the first form of apparatus.

Figure 3:
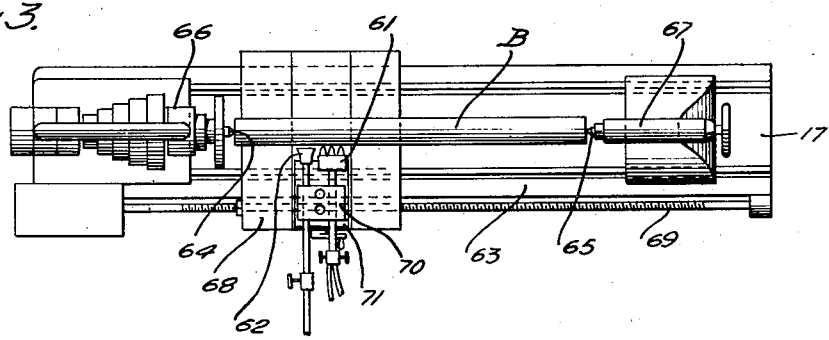
Fig. 3 is a plan view of another form of apparatus showing the body to be heat treated as mounted on a lathe for rotative movement and a blowpipe arranged for reciprocating movement.

Another alternative embodiment of this invention, as shown in Fig. 3, may comprise an arrangement of a blowpipe 61 and cooling nozzle 62 in conjunction with a lathe 63. A body B of unidimensional curvature, such as a shafting, which it is desired to case harden from end to end, or over an area of appreciable length, may be suspended between the centers 64 and 65 of the head stock 66 and tail stock 67 respectively of the lathe 63. When so held the body B may be rotated at any convenient speed while the surface is subjected to heat from the blowpipe 61 which will raise the temperature uniformly on a peripheral area substantially equal to the width of the blowpipe.

However the surface of the body B may be treated simultaneously along the entire length thereof by mounting the blowpipe 61 and nozzle 62 on the carriage 68 of the lathe and moving the carriage back and forth relative to the body by operating the lead screw 69. The blowpipe 61 and cooling nozzle 62 are preferably supported on a substantially horizontal plane, which intersects the center axis of the body B, by clamping these members on a block 70 which is bolted to the slide rest 71 of the lathe. The slide rest 71 may be moved laterally across the carriage 68 of the lathe in the usual manner so as to adjust the heating and cooling members 61 and 62 most effectively with regard to the surface of the work.

When the body B and the blowpipe 61 are both moved relative to one another, one rotatively and the other reciprocally, the heating flames from the blowpipe nozzles are projected on a helical path on the surface of body B, and as the operation continues, the entire surface area of the body is raised to the critical range. After the correct temperature for hardening has been reached, the gases to the blowpipe may be shut off and water or cooling medium may be immediately supplied by the nozzle 62, which effects rapid cooling of the body B. The quench of the body is substantially simultaneous over the entire area, and for this reason a uniform "case" is produced.

Although more than one embodiment of this invention has been illustrated and described, it will be understood that changes may be made without departing from the scope of this invention.

I claim:—

1. A method of hardening a surface of a metal body, portions adjacent the boundaries of said surface having a lower rate of heat loss than the remainder of said surface, such method comprising applying a localized high temperature heating medium to said remainder of said surface while reciprocating said body and said medium relatively to one another in such a manner that the reversals of movement during such reciprocation occur at short distances from said boundaries; repeating such reciprocation a sufficient number of times to substantially uniformly heat said surface to or above the critical range; then discontinuing the application of said heating medium; and thereupon cooling such heated surface sufficiently to harden the same.

2. A method of hardening a unidimensional curved surface of a metal body, portions adjacent the boundaries of said surface having a lower rate of heat loss than the remainder of said surface, such method comprising applying a localized high temperature heating medium to said remainder of said surface while rotating said body about the center of curvature of said surface and also while reciprocating said body and said medium relatively to one another in such a manner that the reversals of movement during such reciprocation occur at short distances from said boundaries; continuing such rotation and repeating said reciprocation a sufficient number of times to substantially uniformly heat said surface to or about the critical range; then discontinuing the application of said heating medium; and thereupon cooling such heated surface sufficiently to harden the same.

AUGUSTUS B. KINZEL.